(12) United States Patent
Moriguchi et al.

(10) Patent No.: US 8,140,134 B2
(45) Date of Patent: Mar. 20, 2012

(54) ELECTRONIC DEVICE

(75) Inventors: Takashi Moriguchi, Yokohama (JP);
Seiji Horii, Yokohama (JP)

(73) Assignee: Kyocera Corporation, Kyoto (JP)

( * ) Notice: Subject to any disclaimer, the term of this patent is extended or adjusted under 35 U.S.C. 154(b) by 425 days.

(21) Appl. No.: 12/401,444

(22) Filed: Mar. 10, 2009

(65) Prior Publication Data
US 2009/0231787 A1    Sep. 17, 2009

(30) Foreign Application Priority Data
Mar. 13, 2008    (JP) .................................. 2008-064971

(51) Int. Cl.
*H04M 1/00*    (2006.01)
(52) U.S. Cl. ................ 455/575.4; 455/575.1; 455/575.3
(58) Field of Classification Search ............... 455/575.1, 455/575.3–575.4, 550.1; 361/814
See application file for complete search history.

(56) References Cited

U.S. PATENT DOCUMENTS

| | | | |
|---|---|---|---|
| 7,054,145 B2 | 5/2006 | Tanaka et al. | |
| D558,714 S * | 1/2008 | Kim et al. | D14/138 AD |
| 7,369,882 B2 * | 5/2008 | Hwang et al. | 455/575.1 |
| 2005/0105252 A1 | 5/2005 | Tanaka et al. | |
| 2008/0051162 A1 * | 2/2008 | Kim et al. | 455/575.3 |

FOREIGN PATENT DOCUMENTS

| | | |
|---|---|---|
| JP | 2005-051420 | 2/2005 |
| JP | 2005149467 A | 6/2005 |
| JP | 2005252592 A | 9/2005 |

OTHER PUBLICATIONS

Japanese language office action dated Jun. 1, 2010 and its English language translation for corresponding Japanese application 2008064971 lists the references above.

* cited by examiner

*Primary Examiner* — Anh Tran
(74) *Attorney, Agent, or Firm* — DLA Piper LLP (US)

(57) ABSTRACT

The present invention has an object to provide an electronic device to improve user convenience, in which a cellular phone 1 includes an operation unit side body 2 having an operation face 2A, a display unit side body 3 having a display face 3A, the display unit side body 3 being disposed at the operation face 2A side of the operation unit side body 2, a connecting body 6 disposed between the operation unit side body 2 and the display unit side body 3, a rotating connection unit 4 that connects the display unit side body 3 with the connecting body 6 to be mutually rotatable around a rotational axis Z1 extending in a thickness direction, and a pivoting connection unit 5 that connects the operation unit side body 2 with the connecting body 6 so that an angle between the operation face 2A and the display face 3A can be varied.

11 Claims, 14 Drawing Sheets

ELECTRONIC DEVICE

This application is based on and claims the benefit of priority from Japanese Patent Application No. 2008-064971, filed on 13 Mar. 2008, the content of which is incorporated herein by reference.

BACKGROUND OF THE INVENTION

1. Field of the Invention

The present invention relates to an electronic device, such as a cellular phone.

2. Related Art

Conventionally, there has been a so-called flat type, a flip type (foldable), a rotating screen type, and the like for cellular phones as an electronic device.

As a rotating screen type cellular phone, for example, a cellular phone has been proposed, which has an operation unit side body and a display unit side body, which can be superimposed on each other, and a connecting portion that connects both bodies to be rotatable around an axis line extending the superimposed direction (see Japanese Unexamined Patent Application, First Publication No. 2005-51420).

SUMMARY OF THE INVENTION

However, the cellular phone disclosed in Japanese Unexamined Patent Application, First Publication No. 2005-51420 has a problem in that, for example, it is difficult to view the display unit thereof while placed on a desk and the like.

In particular, for example, in a case where the cellular phone has a television function, it is difficult to watch pictures in television clearly while the cellular phone is placed on a desk.

It is an object of the present invention to provide an electronic device which can improve user convenience.

The present invention relates to an electronic device, including a first body that has a first face; a second body that has a second face, and is disposed at a side of the first face of the first body; a third body that is disposed between the first body and the second body; a rotating connection unit that connects the second body with the third body to be mutually rotatable around a rotational axis extending in a thickness direction of the second body; and a pivoting connection unit that connects the first body with the third body so that an angle between the first face and the second face can be varied.

Furthermore, it is preferable that the rotating connection unit can rotationally move the second body to a closed state in which the first face is covered with the second body and to an opened state in which at least a portion of the first face is exposed, and the pivoting connection unit can pivotally moves the third body and the second body so that the third body and the second body are inclined to a raised state with respect to the first body in the opened state.

Furthermore, it is preferable that the rotating connection unit can be rotationally moved to a first opened state in which the second body is rotationally moved substantially 90 degrees to a first direction from the closed state, and to a second opened state in which the second body is rotationally moved substantially 90 degrees to a second direction, which is opposite to the first direction, from the closed state, and the pivoting connection unit can be rotationally moved to a first raised state in which the third body and the second body are inclined with respect to the first body in the first opened state, and to a second raised state in which the third body and the second body are inclined with respect to the first body in the second opened state, respectively.

Furthermore, it is preferable that the first body and the second body have substantially the same outer shape, as viewed from the rotational axis, and the outer edges thereof are substantially superimposed on each other in the closed state, the rotating connection unit is disposed at one end side in the longitudinal direction and substantially at the center in the width direction of the first body and the second body, and the outer edge of the other end side in the longitudinal direction of the second body is disposed to be superimposed with an outer edge in the width direction of the first body in the first opened state and the second opened state.

Furthermore, it is preferable that the rotating connection unit in the first opened state or the second opened state is located more towards the one end side in the longitudinal direction of the first body than the rotating connection unit in the closed state.

Furthermore, it is preferable that the abovementioned electronic device includes: a plurality of functions; and a function control unit for operating a predetermined function among the plurality of functions, in which the function control unit operates a first function in a case in which the second body is rotationally moved from the closed state to the first opened state, and operates a second function, which is different from the first function, in a case in which the second body is rotationally moved from the closed state to the second opened state.

Furthermore, it is preferable that at least one of the first function and the second function is a television viewing function.

Furthermore, it is preferable that the first body comprises a receiving portion which is formed at the side of the first face and in which the third body is arranged to be housed in the closed state.

Furthermore, it is preferable that the receiving portion is a concave shape, and an electronic device is disposed to be housed between a bottom face of the receiving portion of the first body and a face on an opposite side to the first face.

Furthermore, it is preferable that an operation unit is disposed in the first face, a display unit is disposed in the second face, and the second face is exposed externally in the closed state and the opened state.

According to the present invention, an electronic device able to improve user convenience can be provided.

DETAILED DESCRIPTION OF THE INVENTION

In the following, a preferred embodiment for implementing the present invention is described with reference to the drawings.

A basic configuration of a cellular phone 1 as an electronic device is described with reference to the FIGS. 1 to 7.

Figure 1:
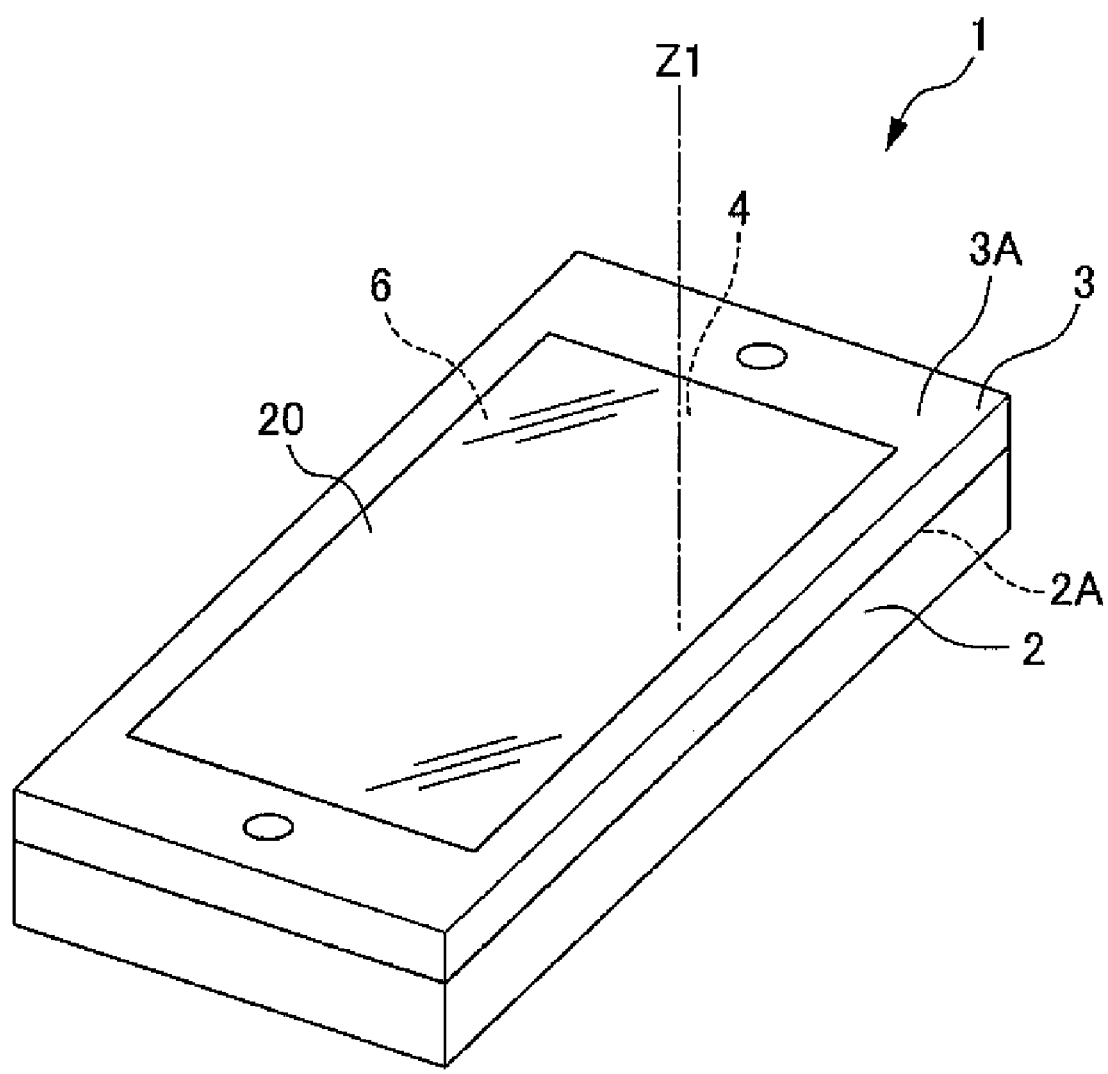
FIG. 1 is a perspective view of a cellular phone 1 in a closed state.
Figure 2:
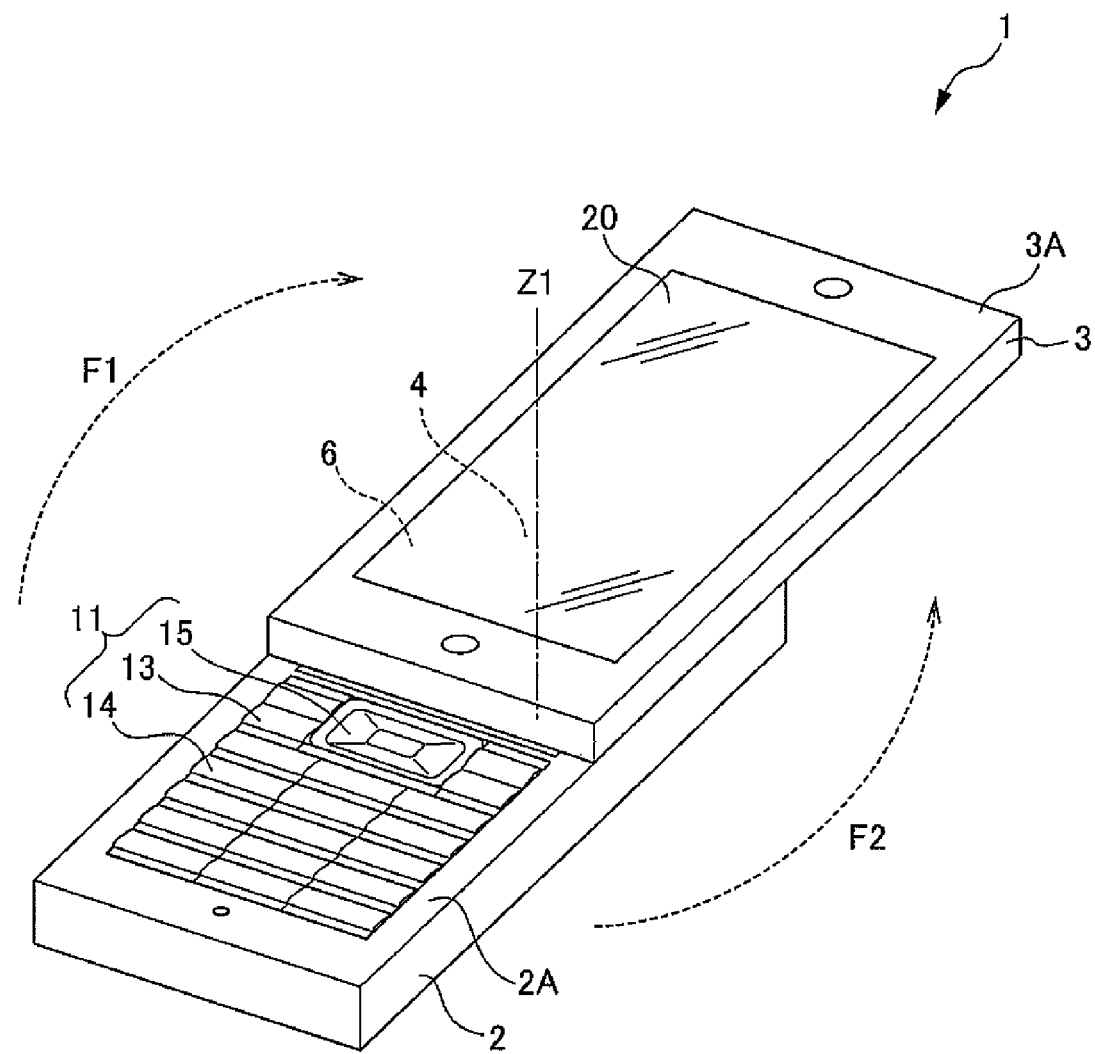
FIG. 2 is a perspective view of a cellular phone 1 in an opened state (a third opened state)
Figure 3:
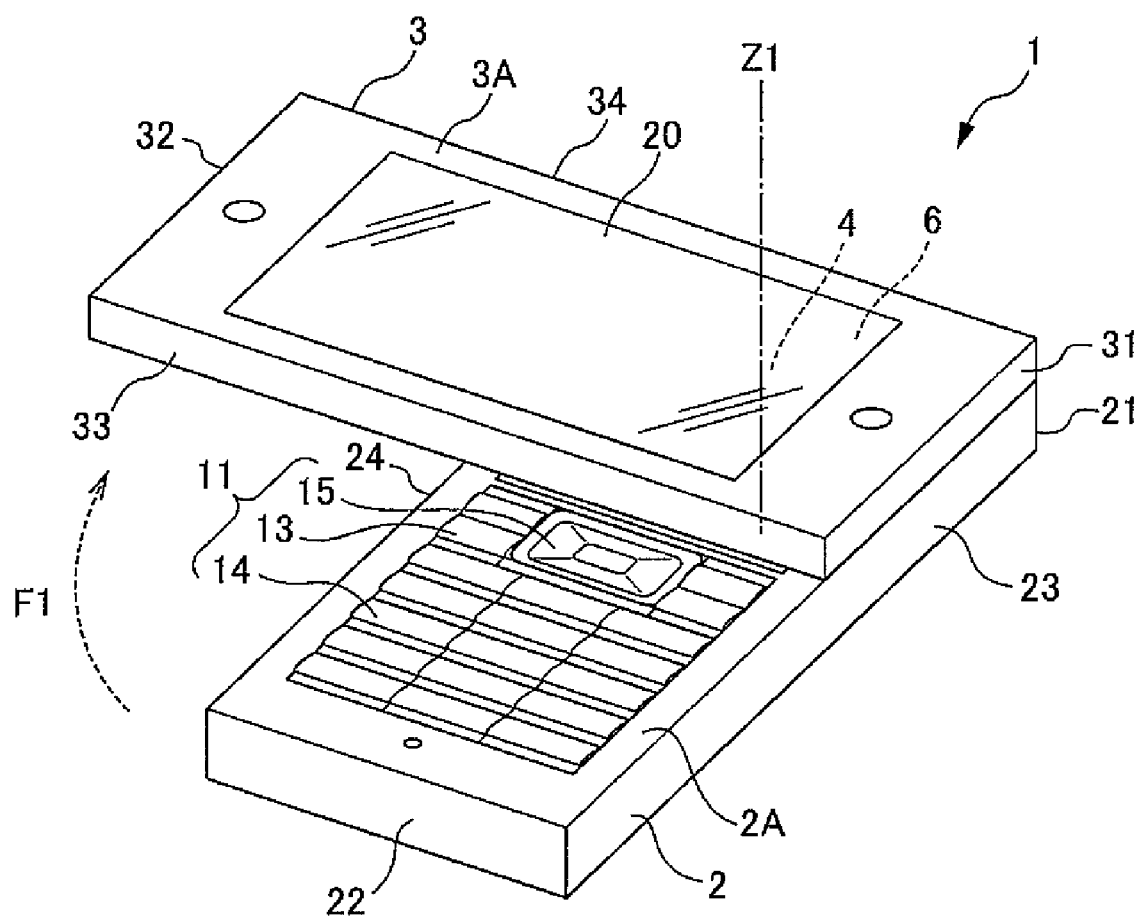
FIG. 3 is a perspective view of a cellular phone 1 in a first opened state.
Figure 4:
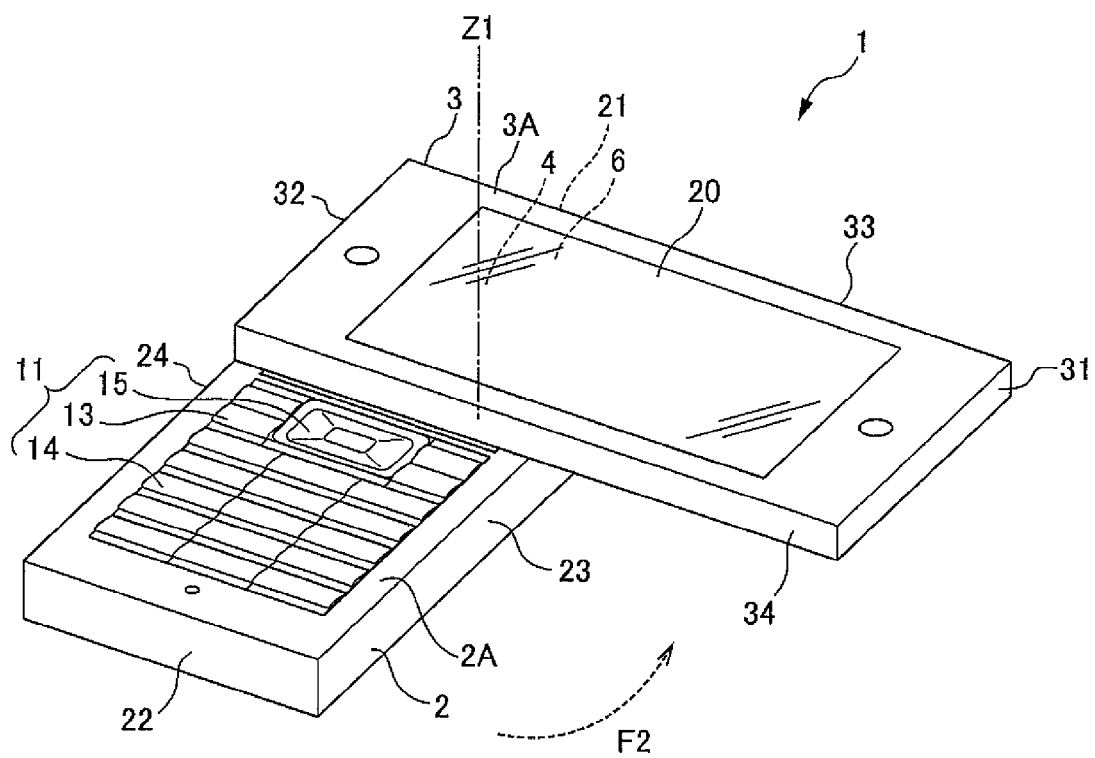
FIG. 4 is a perspective view of a cellular phone 1 in a second opened state.
Figure 5:
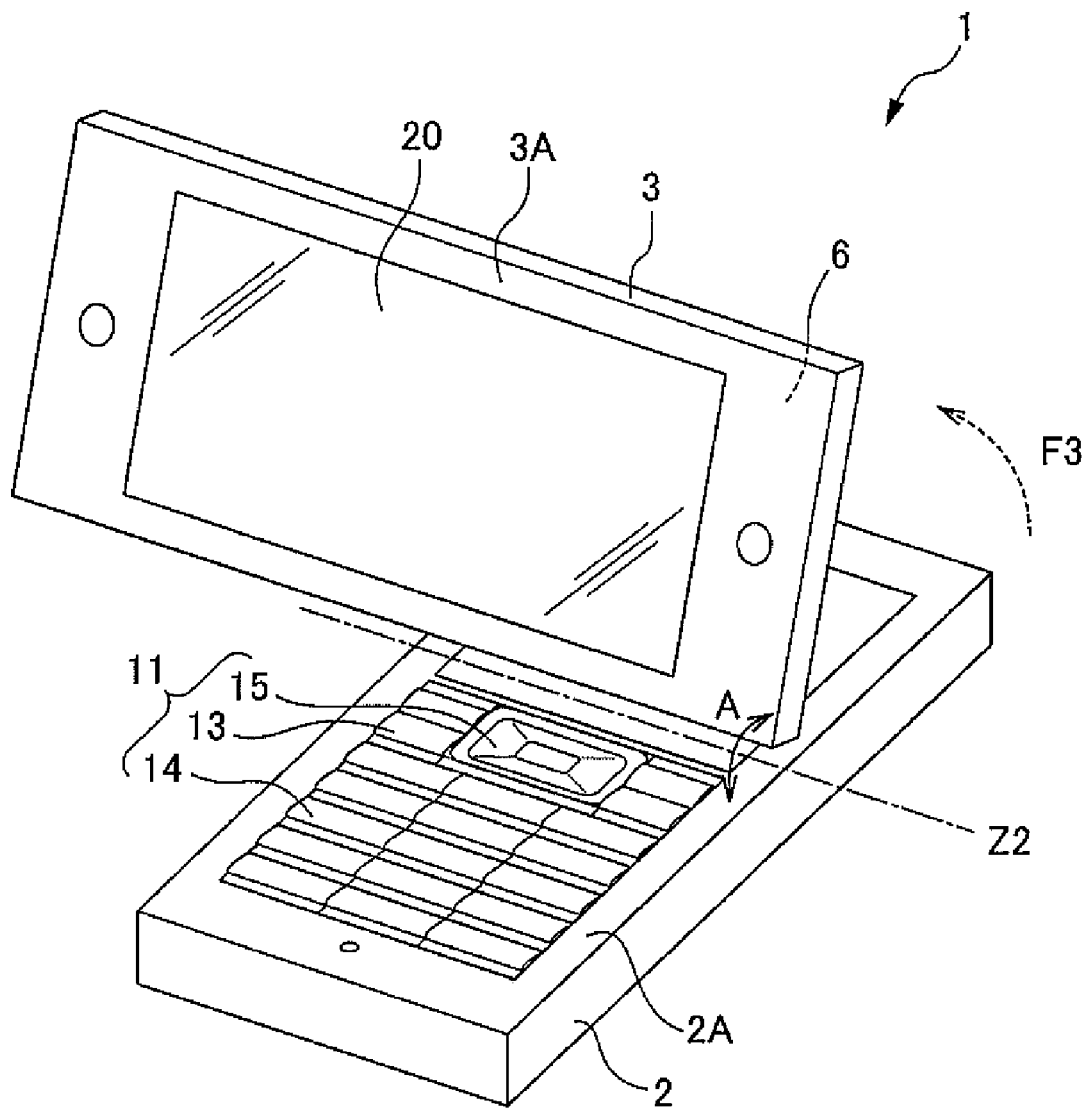
FIG. 5 is a perspective view of a cellular phone 1 in a first raised state.
Figure 6:
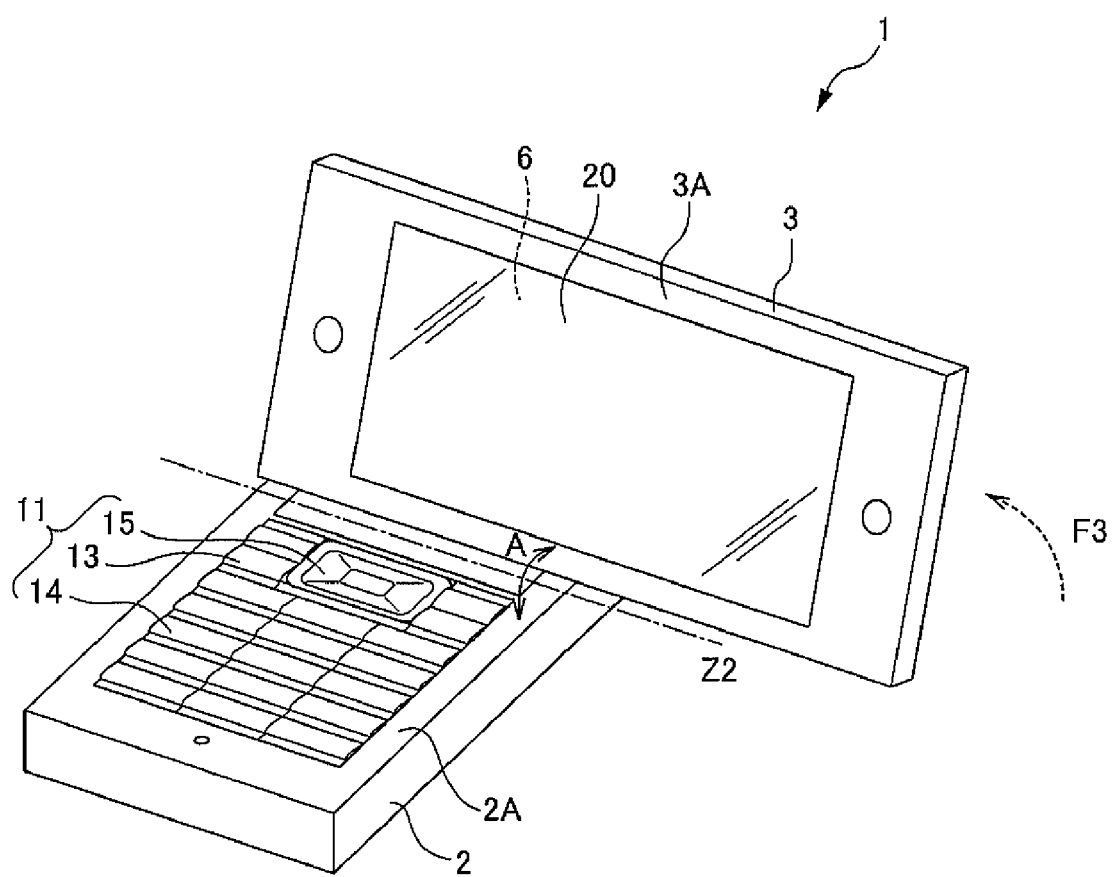
FIG. 6 is a perspective view of a cellular phone 1 in a second raised state.
Figure 7:
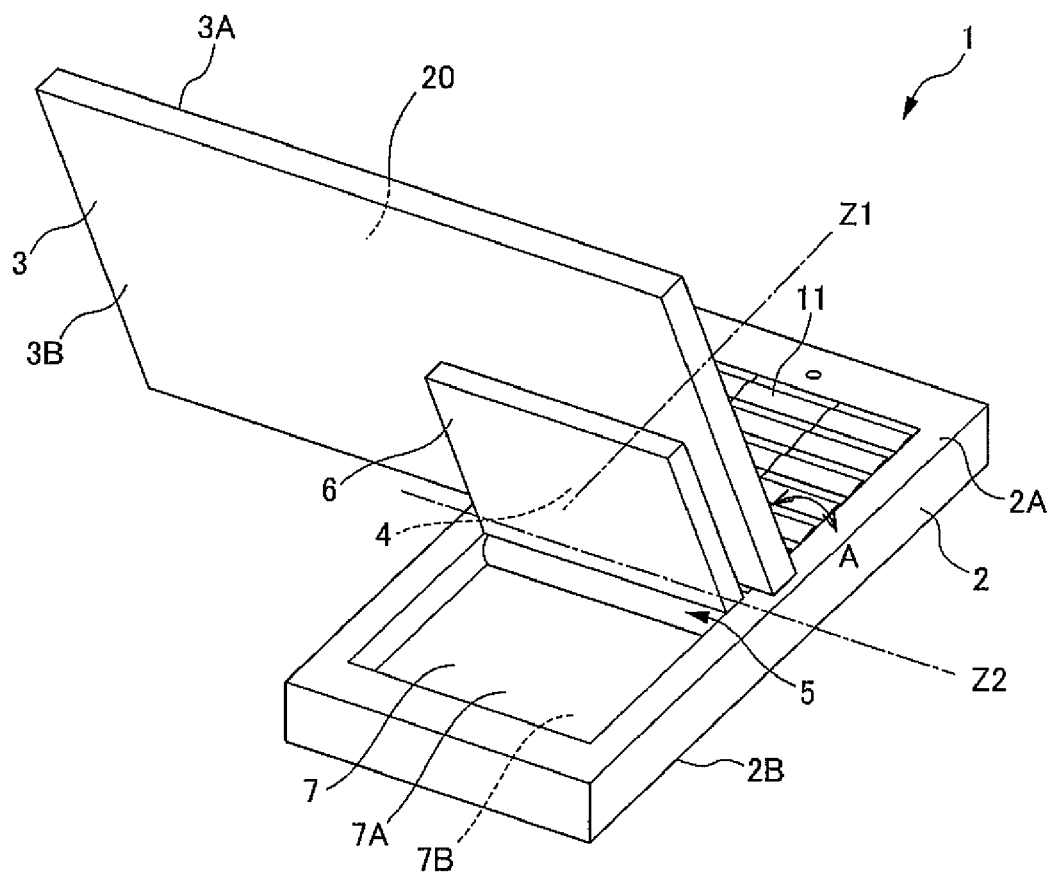
FIG. 7 is a perspective view of a cellular phone 1 in a second raised state, as seen from a back side.

FIG. 1 is a perspective view of a cellular phone 1 in a closed state. FIG. 2 is a perspective view of a cellular phone 1 in an opened state (a third opened state). FIG. 3 is a perspective view of a cellular phone 1 in a first opened state. FIG. 4 is a perspective view of a cellular phone 1 in a second opened state. FIG. 5 is a perspective view of a cellular phone 1 in a first raised state. FIG. 6 is a perspective view of a cellular phone 1 in a second raised state. FIG. 7 is a perspective view of a cellular phone 1 in a second raised state, as seen from a back side.

As shown in FIGS. 1 to 7, the cellular phone 1 includes an operation unit side body 2 as a first body, a display unit side body 3 as a second body, a connecting body 6 as a third body, a rotating connection unit 4 that connects the connecting body 6 with the display unit side body 3 to be rotatable around a rotational axis Z1, and a pivoting connection unit 5 for pivotally connecting the connecting body 6 with the operation unit side body 2 around a pivot axis Z2. The operation unit side body 2 and the display unit side body 3 have substantially the same outer shape, as seen from the rotational axis Z1 direction at the rotating connection unit 4.

The operation unit side body 2 includes an operation unit 11. The operation unit 11 is disposed on an operation face 2A as a first face. The operation unit 11 is configured with a function setting operation key 13 that operates various settings and various functions such as an address book function and mail function, an input operation key 14 for inputting numbers such as of a telephone number and characters in mail, and a determining operation key 15 as an operation member that, for example, determines various operations and performs scrolling in a right and left or up and down direction. For each key that configures the operation unit 11, a predetermined function is assigned corresponding to states of the operation unit side body 2 and the display unit side body 3 (an opened state, a closed state, and a raised state), various modes, or types of applications and the like activated (key-assign). Then, an operation corresponding to a function assigned to each of the keys is performed by a user pressing each of the keys.

In addition, a key structure part, a key substrate, a casing, a first circuit substrate including a reference potential pattern layer and various electronic components such as a RP (Radio Frequency) module for a cellular phone, CPU and the like, an antenna unit, and a battery are arranged to be housed in the operation unit side body 2.

In addition, a receiving portion 7 of concave shape which can receive the connecting body 6 is formed in the operation face 2A of the operation unit side body 2. The receiving portion 7 is formed at a side different from the side in which the operation unit 11 is formed in a longitudinal direction of the operation face 2A. In addition, the receiving portion 7 is formed to be adjacent with the pivoting connection unit 5.

The operation unit side body 2 is connected with the connecting body 6 to be mutually pivotable around the pivot axis Z2 by way of the pivoting connection unit 5. The operation unit side body 2 is connected with the display unit side body 3 to be pivotable around the pivot axis Z2 via the connecting body 6.

The display unit side body 3 includes a display face 3A as a second face. The display face 3A is exposed externally while the cellular phone 1 is in a closed state or an opened state.

The display unit side body 3 includes a display unit 20. The display unit 20 is disposed on the display face 3A as a second face. The display unit 20 is disposed to be exposed externally so that an image displayed can be visually recognized. The display unit 20 is configured with a liquid crystal panel, a driving circuit for driving the liquid crystal panel, and a light source unit such as a backlight that irradiates light from a back side of the liquid crystal panel.

In addition, a sound output portion, the display unit 20, and a print substrate 71 as a second circuit substrate to which the display unit 20 is connected are arranged to be housed in the display unit side body 3.

The display unit side body 3 is connected together with the connecting body 6 by way of the rotating connection unit 4 to be rotatable around the rotational axis Z1. The display unit side body 3 is connected with the operation unit side body 2 via the connecting body 6 to be rotatable around the rotational axis Z1.

The rotating connection unit 4 connects the connecting body 5 together with the display unit side body 3 to be rotatable around the rotational axis Z1. The rotating connection unit 4 can rotationally move the display unit side body 3 into a closed state where the operation face 2A is covered with the display unit side body 3, and into an opened state where all or a part of the operation face 2A is exposed.

The rotating connection unit 4, when in a closed state, is disposed at one end side in the longitudinal direction and substantially at the center in the width direction of the cellular phone 1 (the operation unit side body 2). The rotating connection unit 4 is disposed at a location where an outer edge of a portion of the display unit side body 3, which is superimposed with the operation unit side body 2, is superimposed with an outer edge of the operation unit side body 2, in a first and second opened state, which is described later. As described later, the rotating connection unit 4 is configured to be movable according to the rotational movement of the display unit side body 3. More specifically, the rotating connection unit 4 in a first or second opened state is located on one end side in the longitudinal direction of the operation unit side body 2, closer to the one end side than that in a closed state.

The pivoting connection unit 5 connects the connecting unit 6 with the operation unit side body 2 to be mutually pivotable around the pivot axis Z2. The pivoting connection unit 5 connects one end side of the connecting body 6 and a predetermined position in the central area in the longitudinal direction of the operation unit side body 2 to be pivotable. The pivoting connection unit 5 is disposed proximal to the receiving portion 7. In an opened state, the pivoting connection unit 5 allows the connecting body 6 and the display unit side body 3 to be pivotally moved into a raised state, thereby inclining with respect to the operation unit side body 2. More specifically, the pivoting connection unit 5 allows the connecting body 6 and the display unit side body 3 to be pivotally moved to incline into a first raised state with respect to the operation unit side body 2 in first opened state, and into a second raised state with respect to the operation unit side body 2 in second opened state.

The connecting body 6 is disposed between the operation unit side body 2 and the display unit side body 3. The connecting body 6 is connected with the display unit side body 3 to be rotatable by way of the rotating connection unit 4, and also connected to be pivotable with the operation unit side body 2 by way of the pivoting connection unit 5.

The connecting body 6 is transformably connected with the operation unit side body 2 by way of the pivoting connection unit 5 in a state where the connecting body 6 is arranged to be housed in the receiving portion 7 formed in the operation unit side body 2 and where the connecting body 6 rises into a raised position from the receiving portion 7 by pivotal movement (see FIGS. 5 to 7). Since the connecting body 6 is moved pivotally so that the connecting body 6 raises, the display unit side body 3, which is connected to the connecting body 6 by way of the rotating connection unit 4, is also moved pivotally so that the display unit side body 3 raises. Here, at least in a closed state, the connecting body 6 is arranged to be housed in the receiving portion 7. In the present embodiment, even in the first opened state and the second opened state, the connecting body 6 is arranged to be housed in the receiving portion 7.

The connecting body 6 is connected with the display unit side body 3 via the rotating connection unit 4. The connecting body 6, in a state in which the connecting body 6 is arranged to be housed in the receiving portion 7, is connected with the display unit side body 3 so that the connecting body 6 can be moved rotationally into a closed state (see FIG. 1), a first opened state (see FIG. 3), a second opened state (see FIG. 4), and a third opened state (see FIG. 2).

Subsequently, various embodiments of the cellular phone 1 are described with reference to FIGS. 1 to 7.

As shown in FIG. 1, in the closed state, the operation unit side body 2 and the display unit side body 3 are arranged to be stacked so as to be mutually superimposed. More specifically, the operation unit side body 2 is arranged to be stacked on the operation face side 2A of the display unit side body 3. In detail, the operation unit side body 2 and the display unit side body 3 are disposed so that outer edges thereof are superimposed as seen from the rotational axis Z1 of the rotating connection unit 4. The operation face 2A of the operation unit side body 2 of the cellular phone 1 is not substantially exposed externally in the closed state.

As shown in FIGS. 2 to 4, a portion of the operation face 2A of the operation unit side body 2 is exposed externally in the opened state. In the opened state, all or a portion of the operation unit 11 of the operation unit side body 2 is exposed externally. In the opened state, the display unit side body 3 is disposed so that a portion of the display unit side body 3 is superimposed with the operation unit side body 2. The cellular phone 1 is transformed by rotationally moving the operation unit side body 2 by way of the rotating connection unit 4 from the closed state to the opened state.

More specifically, as shown in FIG. 3, The cellular phone 1 is transformed by rotationally moving the operation unit side body 2 in an arrow F1 direction by way of the rotating connection unit 4 from the closed state to the first opened state.

In the first opened state, an outer edge 32 located at the opposite side of the rotating connection unit 4 in the longitudinal direction of the display unit side body 3 is located at the left side in FIG. 3. In the first opened state, an outer edge 31 located at the rotating connection unit 4 side in the longitudinal direction of the display unit side body 3 is disposed to be superimposed with an outer edge 23 in the width direction of the operation unit side body 2. In addition, an outer edge 34 in the width direction of the display unit side body 3 is disposed to be superimposed with an outer edge 21 in the longitudinal direction of the operation unit side body 2.

In the first opened state, the entire operation unit 11 is exposed externally. By moving the rotating connection unit 4 from the position where it is located in the closed state to the side of the outer edge 21, the display unit side body 3 is moved to the side of the outer edge 21. Thus, in the first opened state, almost all the areas of the operation unit 11 (the entire operation unit 11) is exposed externally.

In addition, as shown in FIG. 4, the cellular phone 1 is transformed from the closed state to the second opened state by rotationally moving the operation unit side body 2 in an arrow F2 direction by way of the rotating connection unit 4.

In the second opened state, the outer edge 31 on the side of the rotating connection unit 4 in the longitudinal direction of the display unit side body 3 is located at the right side in FIG. 4. In the second opened state, the outer edge 32 of an opposite side to the rotating connection unit 4 in the longitudinal direction of the display unit side body 3 is disposed so as to be superimposed with the other outer edge 24 in the width direction of the operation unit side body 2. In addition, the other outer edge 33 in the width direction of the display unit side body 3 is disposed to be superimposed with the outer edge 21 in the longitudinal direction of the operation unit side body 2.

In the second opened state, the entire operation unit 11 is exposed externally. By moving the rotating connection unit 4 from the position where it is located in the closed position to the side of the outer edge 21, the display unit side body 3 is moved to the side of the outer edge 21. Thus, in the second opened state, almost all the area of the operation unit 11 (the entire operation unit 11) is exposed externally.

As described above, as a mode of transformation from the closed state to the opened state, either rotational movement of the display unit side body 3 from the closed state to a first direction or a second direction can be selected. Furthermore, a predetermined function can be operated by transforming the cellular phone 1 from a closed state to an opened state. More specifically, in a case where the cellular phone 1 is transformed from the closed state to the first opened state by rotationally moving the display unit side body 3 in the first direction, a first function among a plurality of functions can be operated, and in a case where the cellular phone 1 is transformed from the closed state to the second opened state by rotationally moving the display unit side body 3 in the second direction, a second function different from the first function can be operated.

Figure 14:
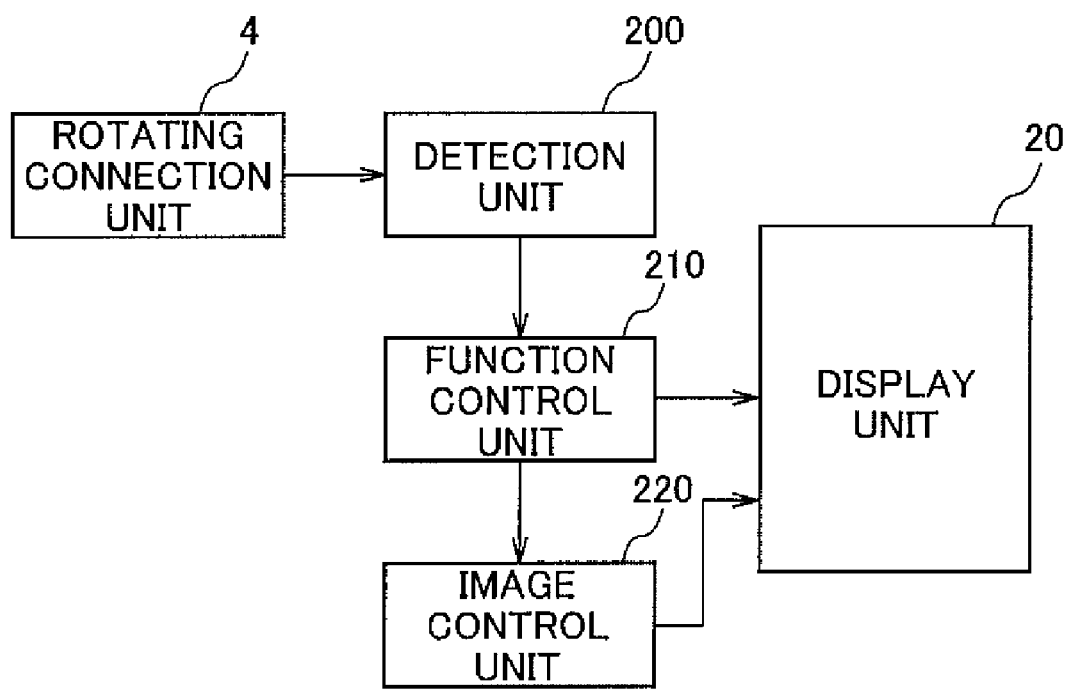
FIG. 14 is a functional block diagram of a cellular phone 1.

In detail, as shown in FIG. 14, the cellular phone 1 includes a detection unit 200 that detects a rotational direction of the operation unit side body 2, a function control unit 210 that operates predetermined functions in response to the rotational direction detected by the detection unit 200, and an image control unit 220 that controls an image display direction (mode) in response to the rotational direction. Then, in a case where the detection unit 200 detects the rotation in the first direction at the display unit side body 3, the function control unit 210 operates a one-segment broadcasting viewing function among a plurality of functions, and the image control unit 220 controls an image display direction (mode) based on the view of the display unit 20 from the operation unit 11 side. In addition, in a case where the detection unit 200 detects the rotation in the second direction at the display unit side body 3, the function control unit 210 operates an e-mail viewing function among a plurality of functions, and the image control unit 220 controls an image display direction (mode) based on the view of the display unit 20 from the operation unit 11 side.

As shown in FIGS. 5 to 7, in a case where the cellular phone 1 is in the opened state, the connecting body 6 and the display unit side body 3 is transformed into a raised state by being pivotally moved in an arrow F3 direction so that the angle A between the display face 3A (or the display unit 20) and the operation face 2A (or the operation unit 11) becomes smaller.

More specifically, as shown in FIG. 5, the cellular phone 1 is transformed into a first raised state by pivotally moving the connecting body 6 and the display unit side body 3 to be raised in the arrow F3 direction from the first opened state in FIG. 3. The raised state of the display unit side body 3 can be set arbitrarily according to a configuration of the pivoting connection unit 5. For example, the raised state of the display unit side body 3 can be set so that the angle A of the display unit side body 3 can raise (vary) continuously from 180 degrees to 0 degrees. In the present embodiment, the angle A of the raised state of the display unit side body 3 is set to raise continuously up to 110 degrees. In the first raised state, the entire operation unit 11 is exposed, and the display unit 20 is disposed so as to be longer in the horizontal direction. That is, the operation unit 11 can be operated while an image displayed on the display unit 20 is viewed. In addition, it can be considered that the first raised state is preferable to display television, motion pictures, and the like.

As shown in FIG. 6, the cellular phone 1 is transformed into a second raised state by pivotally moving the connecting body 6 and the display unit side body 3 to be raised in the arrow F3 direction from the second opened state in FIG. 4. The raised state of the display unit side body 3 is similar to the abovementioned description. The second raised state is also similar to the abovementioned description. That is, the entire operation unit 11 is exposed, and the display unit 20 is disposed so as to be longer in the horizontal direction. That is, the operation unit 11 can be operated while an image displayed on the display unit 20 is viewed. In addition, it can be considered that the second raised state is preferable to display pictures in television, motion pictures, and the like.

As shown in FIG. 7, in the raised state, the connecting body 6 is disposed to be spaced apart from the receiving portion 7. The receiving portion 7 is formed in a concave shape, larger than the outer shape of the connecting body 6. The pivoting connection unit 5 is disposed proximal to the receiving portion 7 and is formed along the outer edge of the receiving portion 7.

In addition, electronic components (not shown) as members, a substrate including the circuit substrate 70 on which a CPU and the like is mounted, a battery, and the like are arranged to be housed between a bottom face 7A of the receiving portion 7 and a back face 2B of the operation unit side body 2.

Subsequently, a cam mechanism 30 that moves the rotating connection unit 4 and the movement of the cam mechanism 30 are described.

Figure 8:
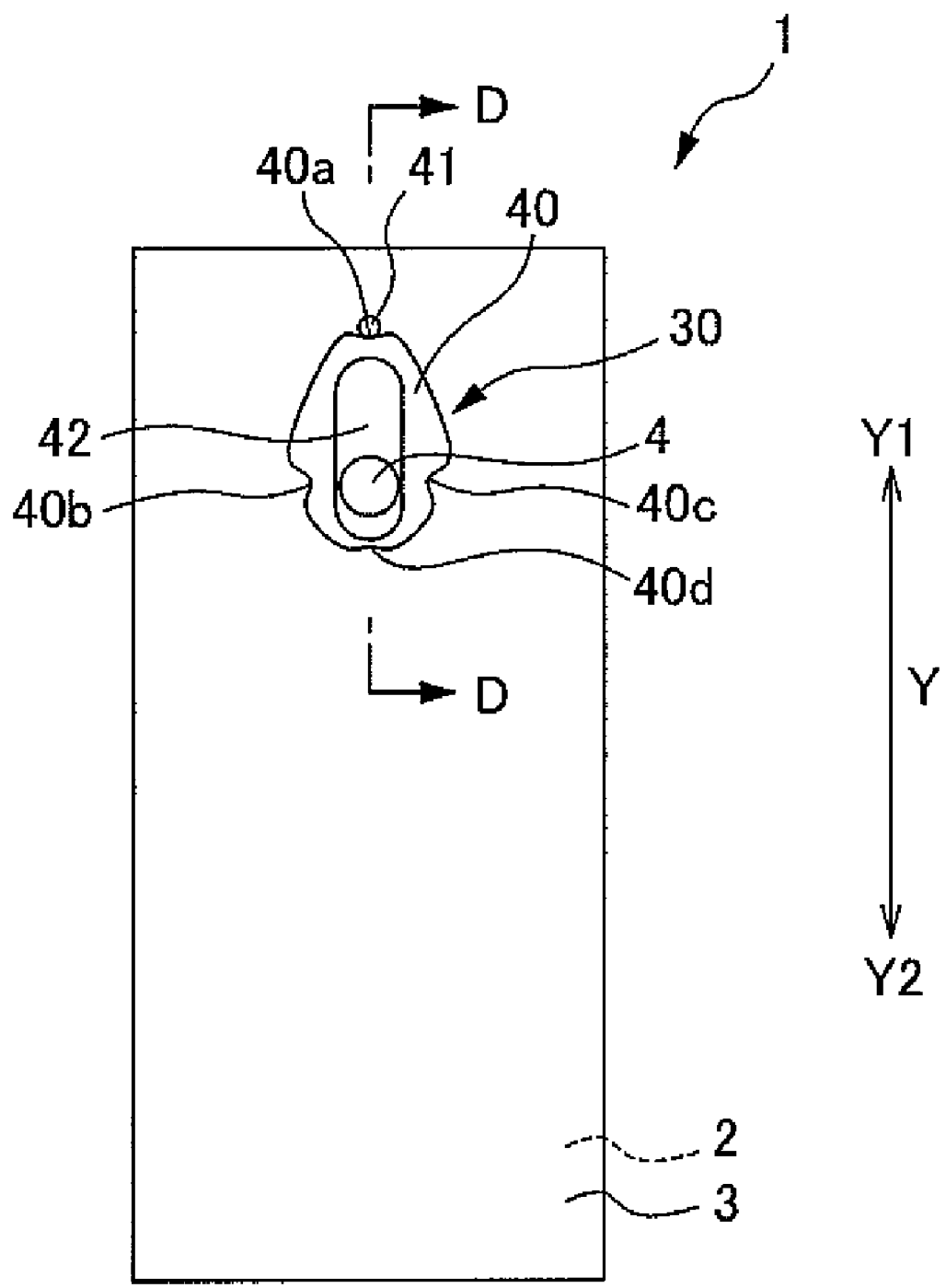
FIG. 8 is a front elevational view showing a cam mechanism 30 in a closed state.
Figure 9:
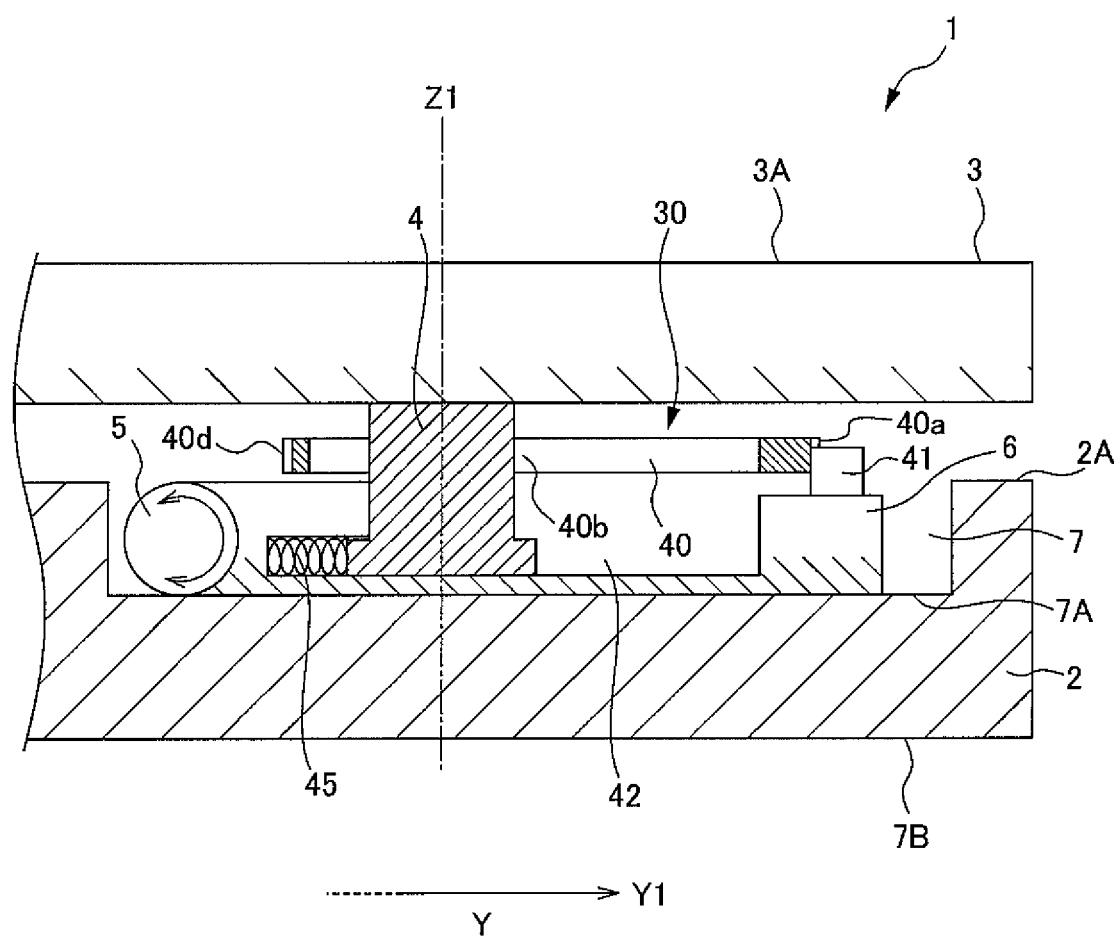
FIG. 9 is a cross-sectional view of D-D in FIG. 8.
Figure 10:
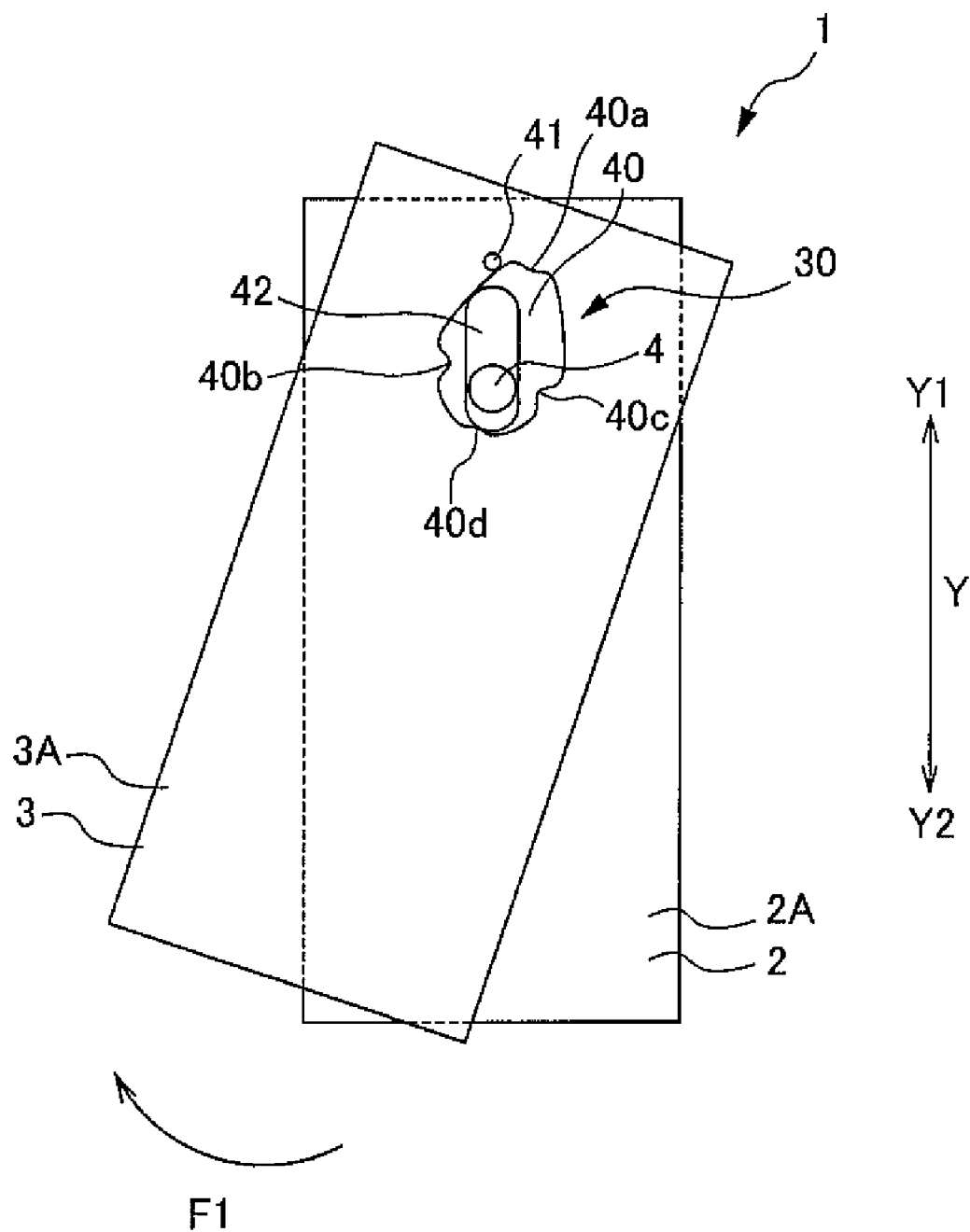
FIG. 10 is a plan view showing a state of a cellular phone 1 being transformed from a closed state to a opened state.
Figure 11:
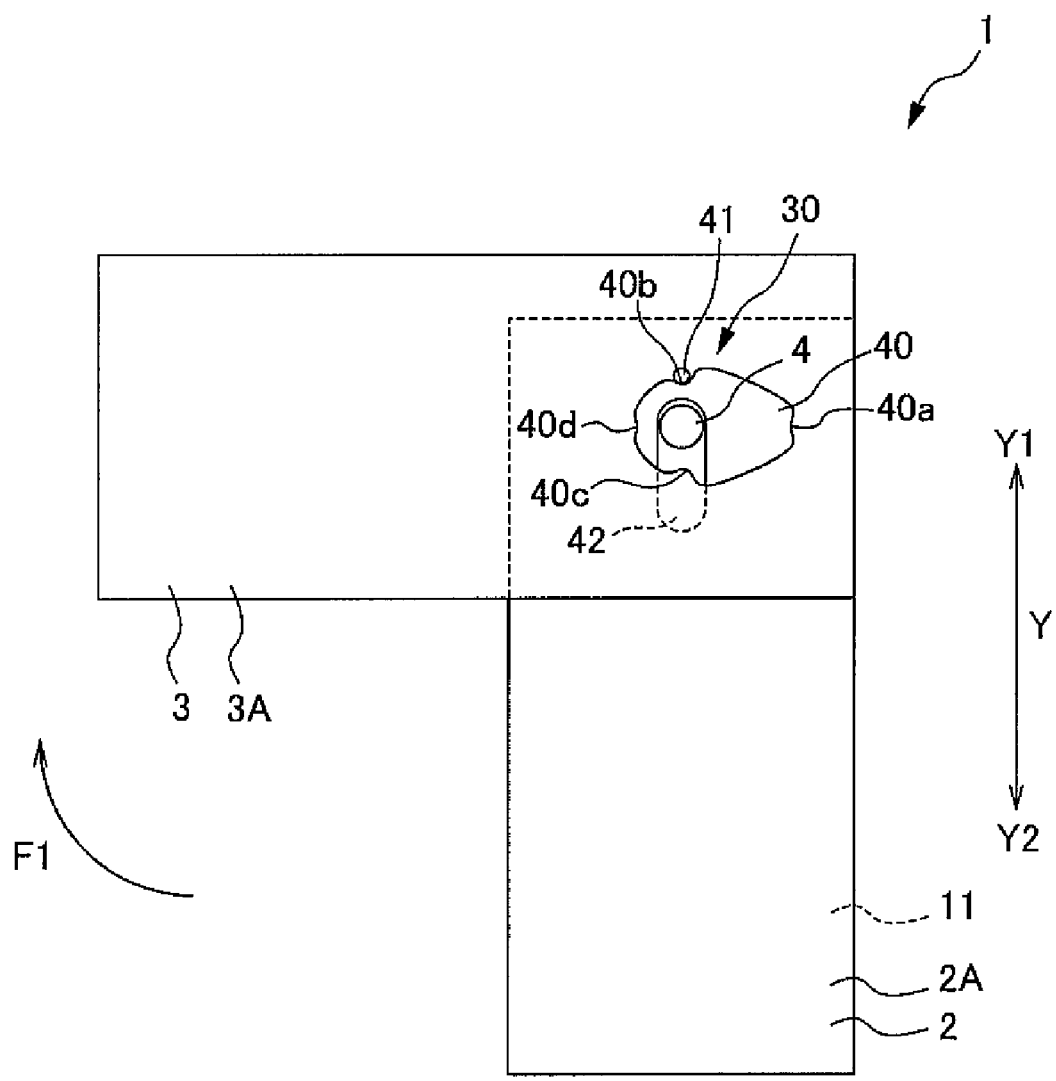
FIG. 11 is a plan view showing a state of a cellular phone 1 being transformed into a first opened state.
Figure 12:
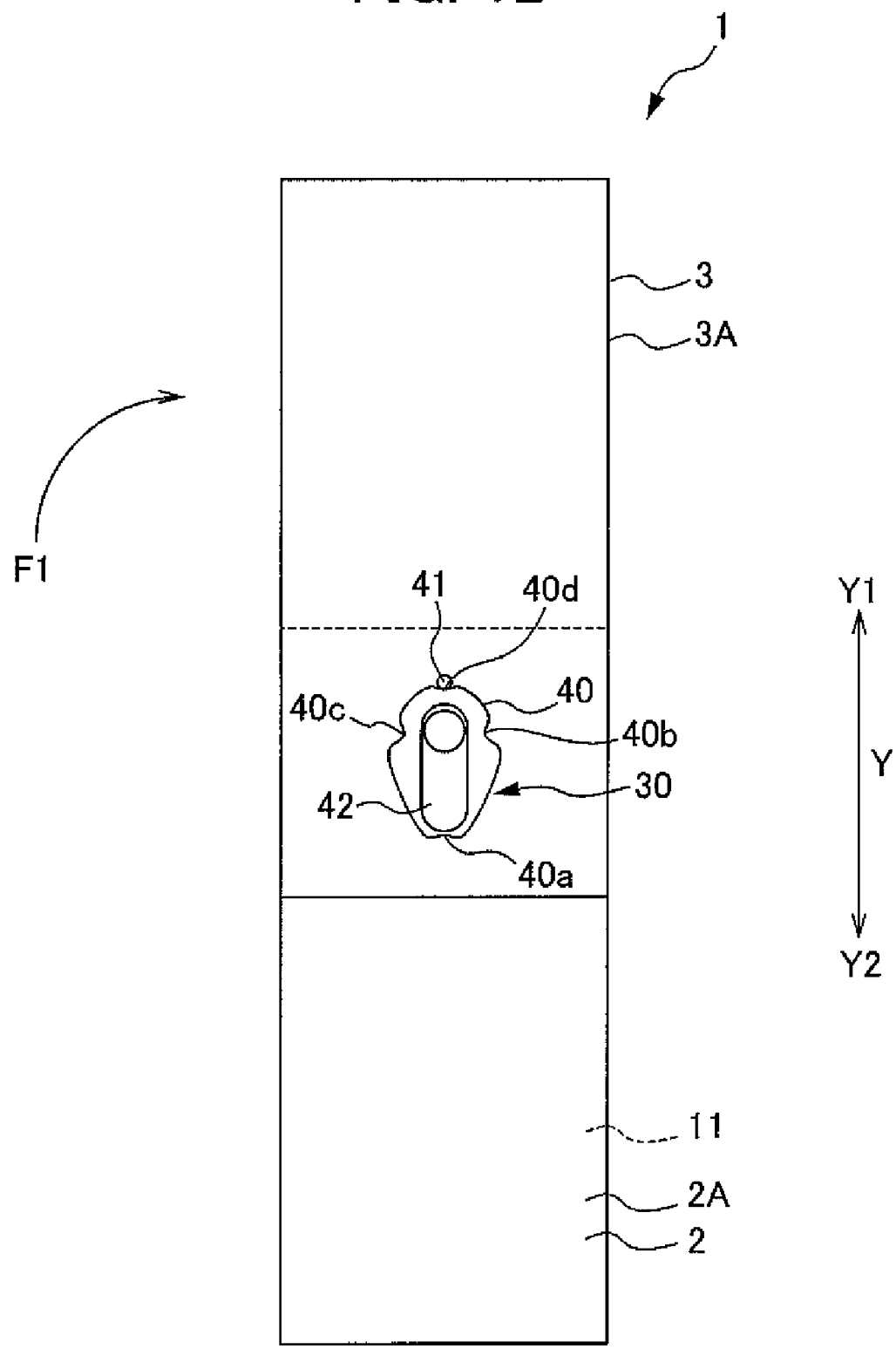
FIG. 12 is a plan view showing a state of a cellular phone 1 being transformed into a third opened state.

FIG. 8 is a front elevational view showing the cam mechanism 30 in the closed state. FIG. 9 is a cross-sectional view of D-D in FIG. 8. FIG. 10 is a plan view showing a state of the cellular phone 1 being transformed from the closed state to the opened state. FIG. 11 is a plan view showing a state of the cellular phone 1 being transformed into the first opened state. FIG. 12 is a plan view showing a state of the cellular phone 1 being transformed into the third opened state.

As shown in FIGS. 8 and 9, the cam mechanism 30 includes a cam unit 40 attached to the rotating connection unit 4, a spring member 45 as a biasing member for biasing the rotating connection unit 4 toward a Y1 side in the longitudinal Y direction, a pin member 41 which abuts the cam unit 40 so as to regulate the movement of the rotating connection unit 4, and a guide unit 42, which is formed at the connecting body 6, that guides the movement of the rotating connection unit 4.

The cam unit 40 is attached to the rotating connection unit 4, and is rotationally moved in response to the rotational movement of the display unit side body 3. The cam unit 40 is formed with an elongated shape, and includes a first concave portion 40a with which the pin member 41 engages in the closed state, a second concave portion 40b with which the pin member 41 engages in the first opened state, a third concave portion 40c with which the pin member 41 engages in the second opened state, and a fourth concave portion 40d with which the pin member 41 engages in the third opened state.

The pin member 41 is abutted at the outer circumference of the cam unit 40, which is rotationally moved by the rotating movement of the display unit side body 3. By way of the pin member 41 abutted at the outer circumference of the cam unit 40, the movement to the Y1 direction in the longitudinal Y direction of the rotating connection unit 4 is regulated.

The spring member 45 biases the rotating connection unit 4 toward the Y1 direction in the longitudinal Y direction. The spring member 45 is disposed so that one end thereof is abutted with the rotating connection unit 4. The spring member 45 is disposed to be abutted with the rotating connection unit 4 in the state of holding a predetermined elastic force.

The pin member 41 is disposed to protrude toward a face of the display unit side body 3 from the connecting body 6. The pin member 41 is disposed to abut the outer circumference of the cam unit 40. The pin member 41 is disposed to be against the biasing direction by way of the spring member 45. The pin member 41 regulates the movement of the cam unit 40, which is biased via the rotating connection unit 4. As described above, the pin member 41 is engaged with the first concave portion 40a in the closed state, engaged with the second concave portion 40b in the first opened state, engaged with the third concave portion 40c in the second opened state, and engaged with the fourth concave portion 40d in the third opened state.

The guide unit 42 is a groove at the connecting body 6 that is formed so as to extend in the longitudinal direction Y and is formed on the display unit side body 2 side of the connecting body 6. The guide unit 42 guides the movement of the rotating connection unit 4 in the longitudinal direction Y.

As shown in FIG. 8, in the closed state, the pin member 41 abuts the first concave portion 40a at the cam unit 40. In the closed state, the rotating connection unit 4 connected with the cam unit 40 is disposed at the Y2 side in the longitudinal direction Y of the guide unit 42.

As shown in FIG. 10, when the display unit side body 3 is rotationally moved in the arrow F1 direction from the closed state, the cam unit 40 is rotationally moved in response to the rotation of the display unit side body 3. Thus, the pin member 41 is abutted between the first concave portion 40a and the second concave portion 40b at the outer circumference of the cam unit 40. As the display unit side body 3 rotationally moves in the arrow F1 direction, the rotating connection unit 4 is moved to the Y1 side in the longitudinal direction Y along the guide unit 42.

As shown in FIG. 11, in the first opened state, the pin member 41 is engaged with the second concave portion 40b at the cam unit 40. The distance from the second concave portion 40b to the rotating connection unit 4 at the cam unit 40 is shorter than that from the first concave portion 40a to the rotating connection unit 4, the rotating connection unit 4 biased by the spring member 45 is moved to the Y2 side in the longitudinal direction Y along the guide unit 42. In the first opened state, the rotating connection unit 4 is disposed at the end of the Y2 side of the guide unit 42. That is, in the first opened state, the display unit side body 3 attached to the rotating connection unit 4 is moved to the Y2 side in the longitudinal direction Y, in response to the movement of the rotating connection unit 4. Thus, a wider area of the operation face 2A (the operation unit 11) of the operation unit side body 2 is exposed externally.

As shown in FIG. 12, in the third opened state, the pin member 41 is engaged with the fourth concave portion 40d at the cam unit 40. In the third opened state, the rotating connection unit 4 is disposed at the end of the Y2 side of the guide unit 42. The larger area of the operation face 2A (the operation unit 11) of the operation unit side body 2 is exposed externally.

Figure 13:
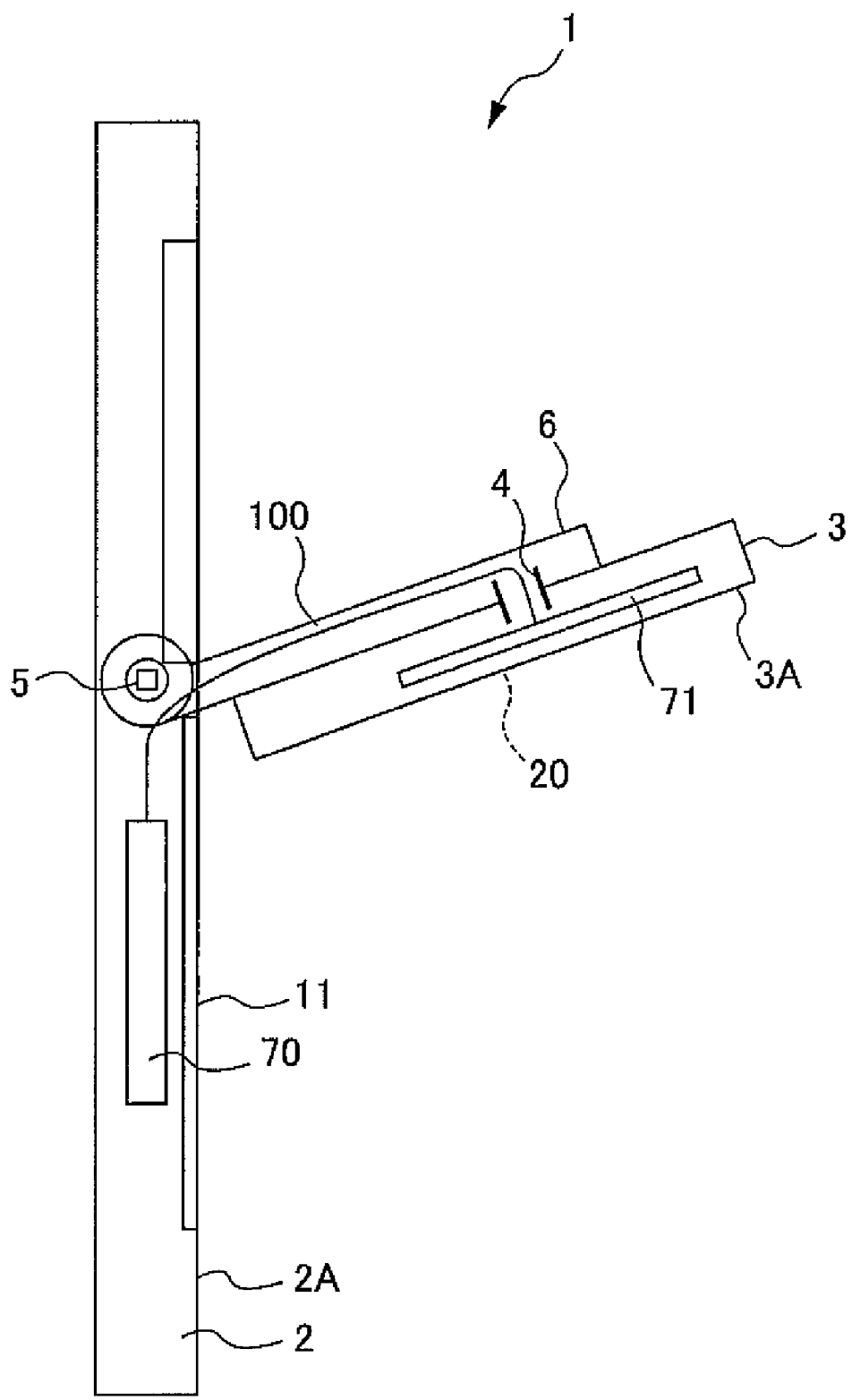
FIG. 13 is a diagram showing installation of a signal wire of a cellular phone 1.

Subsequently, installation of a signal wire 100 of the cellular phone 1 is described with reference to FIG. 13. FIG. 13 is a diagram showing an installation of a signal wire 100 of the cellular phone 1.

As shown in FIG. 13, the signal wire 100 is installed so as to connect the circuit substrate 70 with the print substrate 71, which are arranged to be housed in the operation unit side body 2. The signal wire 100 is installed so as to span the operation unit side body 2, the connecting body 6, and the display unit side body 3.

The signal wire 100 of which one end is connected to the circuit substrate 70, which is arranged to be housed in the operation unit side body 2, is installed up to the connecting body 6 via a hollow portion (not shown) in the pivoting connection unit 5, and is also installed up to the display unit side body 3 via a hollow portion (not shown) in the rotating connection unit 4, and then the other end of the signal wire 100 is connected to the print substrate 71, which is arranged to be housed in the display unit side body 3.

Subsequently, an operation of the cellular phone 1 is described.

Initially, the cellular phone 1 is transformed from the closed state in FIG. 1 to the first opened state shown in FIG. 3 by rotationally moving the display unit side body 3 in the arrow F1 direction.

Thus, initially, the detection unit 200 detects the rotation of the display unit side body 3 in the arrow F1 direction. Next, the function control unit 210 operates a one-segment broadcasting viewing function, and displays images on the display unit 20 based on the one-segment broadcasting of which the display mode is adjusted by the image control unit 220.

Furthermore, in the first opened state, as shown in FIG. 11, the rotating connection unit 4 and the display unit side body 3 are moved to the Y2 side in the longitudinal direction Y, and then the operation unit 1l is exposed. In addition, as shown in FIG. 3, the operation unit side body 2 and the display unit side body 3 are disposed so that the outer edges 23 and 31 are superimposed on each other.

In addition, the cellular phone 1 is transformed from the closed state in FIG. 1 to the second opened state shown in FIG. 4 by rotationally moving the display unit side body 3 in the arrow F2 direction.

Thus, initially, the detection unit 200 detects the rotation of the display unit side body 3 in the arrow P2 direction. Next, the function control unit 210 operates an e-mail viewing function, and displays on the display unit 20 an initial image of the e-mail viewing of which the display mode is adjusted by the image control unit 220.

Furthermore, in the second opened state, the rotating connection unit 4 and the display unit side body 3 are moved to the Y2 side in the longitudinal direction Y, and then the operation unit 11 is exposed. In addition, as shown in FIG. 4, the operation unit side body 2 and the display unit side body 3 are disposed so that the outer edges 24 and 32 are superimposed on each other.

Moreover, the cellular phone 1 is transformed into the first raised state shown in FIG. 5 by pivotally moving the display unit side body 3 to be raised in the arrow F3 direction from the first opened state in FIG. 3. More specifically, the cellular phone 1 is transformed into the first raised state by pivotally moving the connecting body 6 in the arrow F3 direction so that the display unit side body 3 is pivotally moved to the arrow F3 direction.

In the first raised state, the display unit side body 3 is moved to be opened and closed so that the angle A becomes 110 degrees, and the resulting state is held.

In the first raised state, as seen from the operation unit 11, images based on the one-segment broadcasting can be preferably viewed on the display 20.

In addition, the cellular phone 1 is transformed into the second raised state shown in FIG. 6 by pivotally moving the display unit side body 3 to be raised in the arrow F3 direction from the second opened state in FIG. 4. More specifically, the cellular phone 1 is transformed into the second raised state by pivotally moving the connecting body 6 in the arrow F3 direction so that the display unit side body 3 is pivotally moved to the arrow F3 direction.

In the second raised state, the display unit side body 3 is moved to be opened and closed so that the angle A becomes 110 degrees, and the resulting state is held.

In the second raised state, as seen from the operation unit 11, images based on the e-mail viewing function can be preferably viewed on the display 20, and an operation for inputting characters can be preferably performed at the operation unit 11.

According to the present embodiment, since the cellular phone 1 can not only be transformed from the closed state to the opened state, but also into the raised state, the cellular phone 1 can be transformed into modes in which images displayed on the display unit 20 can be viewed clearly according to users' operating modes, which can improve user convenience. For example, in a case where the cellular phone 1 is placed on a desk and the like, a one-segment broadcasting, motion pictures, e-mail, internet, games, images such as of motion pictures (including real-time video images) can be viewed and listened to preferably, by transforming the cellular phone 1 into the first raised state and the second raised state. In addition, it is specifically preferable if an image displayed is horizontally long.

Furthermore, according to the present embodiment, the cellular phone 1 can be utilized in both the first raised state and the second raised state. Thus, images displayed on the display unit 20 can be viewed in a predetermined mode, which can improve user convenience. It should be noted that the angle A is not limited to 110 degrees, and another angle may be used. Considering the visibility of the display unit 20, the angle A is preferably from 90 degrees to 170 degrees, more preferably from 100 degrees to 160 degrees. Furthermore, there may be a case in which it is preferable that the angle A is equal or less than 90 degrees based on the visibility of the display unit 20; however, it depends on how the cellular phone 1 is placed on a desk and the like.

In addition, according to the present embodiment, in a case where the cellular phone 1 is transformed from the closed state to the opened state, different functions may be operated depending on a rotating direction of the display unit side body 3. Thus, a function to be operated can be selected, depending on how the cellular phone 1 is transformed into the opened state, which can improve user convenience.

Furthermore, according to the present embodiment, in the first opened state and the second opened state, since the outer edges of the operation unit side body 2 and the display unit side body 3 are disposed to be superimposed on each other, a user can use the cellular phone 1 without feeling discomfort regarding its exterior appearance, which can improve user convenience.

Furthermore, according to the present embodiment, since the rotating connection unit 4 is moved to the Y2 side in the longitudinal direction Y as the cellular phone 1 is transformed from the closed state to the opened state, an exposed face on the operation face 2A can be more broadened. Thus, the operation unit 11 of the operation unit side body 2 can be more broadened, which can improve user convenience.

Furthermore, according to the present embodiment, since the connecting body 6 is housed in the receiving portion 7, the thickness of the cellular phone 1 can be thinner. In addition, since the receiving portion 7 is formed in a concave shape, electronic devices, substrates, and the like can be disposed between the bottom face of the receiving portion and the back face 3B of the operation unit side body 2. It is preferable for efficiency of implementation in relation to the cellular phone 1.

Although preferable embodiments are described in the foregoing, the present invention is not limited to the above-mentioned embodiments, it may be implemented in various embodiments. For example, in the present embodiment, although the cellular phone 1 is described as a mobile terminal device, the present invention is not limited thereto, and may be PHS™ (Personal Handy Phone System), a portable navigation device, a laptop computer, and the like.

In addition, in the present embodiment, although the rotating connection unit 4 is configured to be moved to the Y1 side in the longitudinal direction Y as the cellular phone 1 is transformed from the closed state to the opened state, the present invention is not limited thereto, and the rotating connection unit 4 may be configured not to be moved.

Furthermore, in the present embodiment, although it is configured that a one-segment broadcasting viewing function is operated when the cellular phone 1 is transformed from the closed state to the first opened state and an e-mail viewing function is operated when the cellular phone 1 is transformed from the closed state to the second opened state, the present invention is not limited thereto. For example, it may be configured that the e-mail viewing function is operated when in the first opened state and the one-segment broadcasting viewing function is operated when in the second opened state. In addition, another function may be operated in the first opened state or second opened state.

Furthermore, in the present embodiment, although the receiving portion 7 is formed in a concave shape, the present invention is not limited thereto and, for example, may be formed in a hole shape which penetrates the operation unit side body 2 in the thickness direction. In a case where the receiving portion is formed in a hole shape, there is merit in that weight reduction of the cellular phone 1 is possible.

What is claimed is:

1. An electronic device, comprising:
a first body that has a first face;
a second body that has a second face, and is disposed on the first face of the first body;
a third body that is disposed between the first body and the second body;
a rotating connection unit that connects the second body with the third body to be mutually rotatable around a rotational axis extending in a thickness direction of the second body; and
a pivoting connection unit that connects the first body with the third body so that an angle between the first face and the second face can be varied,
wherein the rotating connection unit is configured to move with respect to the third body.

2. The electronic device according to claim 1, wherein:
the rotating connection unit can rotationally move the second body to a closed state in which the first face is covered with the second body and to an opened state in which at least a portion of the first face is exposed, and
the pivoting connection unit can pivotally moves the third body and the second body so that the third body and the second body are inclined to a raised state with respect to the first body in the opened state.

3. The electronic device according to claim 2, wherein:
the rotating connection unit can be rotationally moved to a first opened state in which the second body is rotationally moved substantially 90 degrees to a first direction from the closed state, and to a second opened state in which the second body is rotationally moved substantially 90 degrees to a second direction, which is opposite to the first direction, from the closed state, and
the pivoting connection unit can be rotationally moved to a first raised state in which the third body and the second body are inclined with respect to the first body in the first opened state, and to a second raised state in which the third body and the second body are inclined with respect to the first body in the second opened state, respectively.

4. The electronic device according to claim 3, wherein:
the first body and the second body have substantially the same outer shape, as viewed from the rotational axis, and the outer edges thereof substantially overlap in the closed state,
the rotating connection unit is disposed at one end side in the longitudinal direction and substantially at the center in the width direction of the first body and the second body, and
the outer edge of the other end side in the longitudinal direction of the second body is disposed to be superimposed with an outer edge in the width direction of the first body in the first opened state and the second opened state.

5. The electronic device according to claim 4, wherein the rotating connection unit in the first opened state or the second opened state is located more towards the one end side in the longitudinal direction of the first body than the rotating connection unit in the closed state.

6. An electronic device comprising:
a first body that has a first face;
a second body that has a second face, and is disposed at a side of on the first face of the first body;
a third body that is disposed between the first body and the second body;
a rotating connection unit that connects the second body with the third body to be mutually rotatable around a rotational axis extending in a thickness direction of the second body;
a pivoting connection unit that connects the first body with the third body so that an angle between the first face and the second face can be varied, wherein
the rotating connection unit can rotationally move the second body to a closed state in which the first face is covered with the second body and to an opened state in which at least a portion of the first face is exposed,
the pivoting connection unit can pivotally moves the third body and the second body so that the third body and the second body are inclined to a raised state with respect to the first body in the opened state,
the rotating connection unit can be rotationally moved to a first opened state in which the second body is rotationally moved substantially 90 degrees to a first direction from the closed state, and to a second opened state in which the second body is rotationally moved substantially 90 degrees to a second direction, which is opposite to the first direction, from the closed state, and the pivoting connection unit can be rotationally moved to a first raised state in which the third body and the second body are inclined with respect to the first body in the first opened state, and to a second raised state in which the third body and the second body are inclined with respect to the first body in the second opened state, respectively;

and further comprising:

a plurality of functions;

a function control unit for operating a predetermined function among the plurality of functions, wherein the function control unit operates a first function in a case in which the second body is rotationally moved from the closed state to the first opened state, and operates a second function, which is different from the first function, in a case in which the second body is rotationally moved from the closed state to the second opened state.

7. The electronic device according to claim 6, wherein at least one of the first function and the second function is a television viewing function.

8. The electronic device according to claim 7, wherein the first body comprises a receiving portion which is formed at the side of the first face and in which the third body is arranged to be housed in the closed state.

9. The electronic device according to claim 8, wherein the receiving portion is a concave shape, and an electronic device is disposed to be housed between a bottom face of the receiving portion of the first body and a face on an opposite side to the first face.

10. The electronic device according to claim 2, wherein an operation unit is disposed in the first face, a display unit is disposed in the second face, and the second face is exposed externally in the closed state and the opened state.

11. An electronic device, comprising:

a first body that has a first face;

a second body that has a second face, and is disposed on the first face of the first body;

a third body that is disposed between the first body and the second body;

a rotating connection unit that connects the second body with the third body to be mutually rotatable around a rotational axis extending in a thickness direction of the second body; and a function control unit configured to operate a predetermined function, wherein the function control unit operates a first function in a case in which the second body is rotationally moved from a closed state to a first opened state in which the second body is rotationally moved substantially 90 degrees to a first direction from the closed state, and operates a second function, which is different from the first function, in a case in which the second body is rotationally moved from the closed state to the second opened state in which the second body is rotationally moved substantially 90 degrees to a second direction, which is opposite to the first direction, from the closed state.

\* \* \* \* \*